June 7, 1966 J. W. KLOSS 3,255,343
AIRCRAFT WING TIP LIGHT
Filed April 13, 1964

INVENTOR.
John W Kloss
BY Ralph Hammar
Attorney

United States Patent Office 3,255,343
Patented June 7, 1966

3,255,343
AIRCRAFT WING TIP LIGHT
John W. Kloss, Erie, Pa., assignor to Lord Corporation, a corporation of Pennsylvania
Filed Apr. 13, 1964, Ser. No. 359,372
8 Claims. (Cl. 240—7.7)

This invention is intended to improve the light output and distribution of aircraft wing tip lights within the space and environmental limitations of supersonic aircraft.

Figure 1:
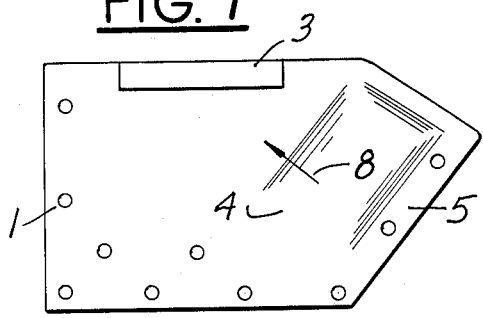
Figure 2:
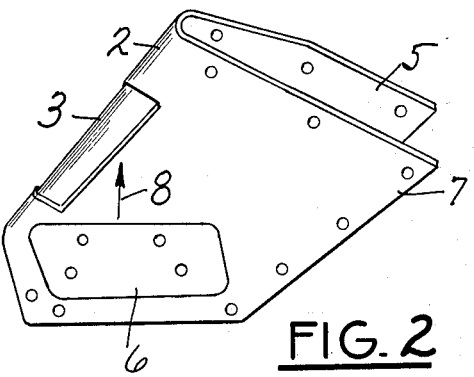
Figure 3:
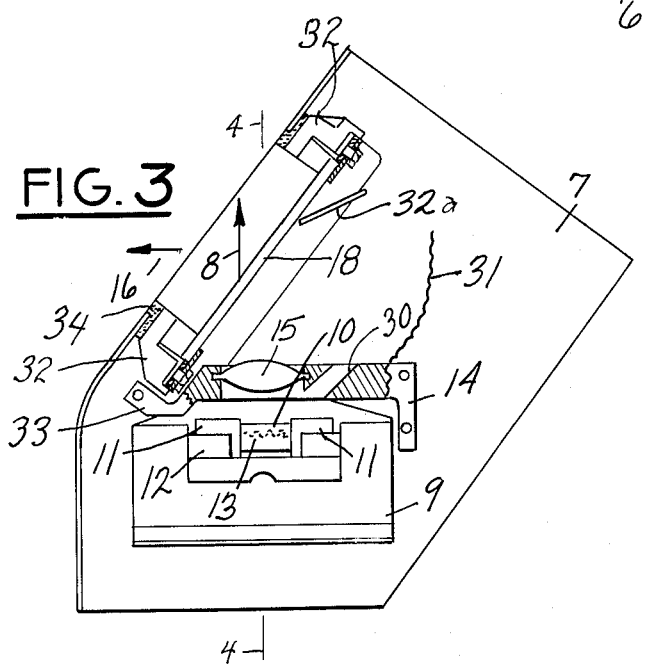
Figure 4:
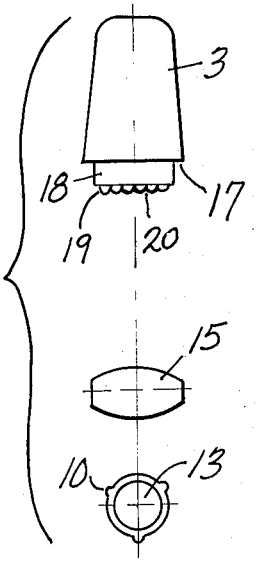
Figure 5:
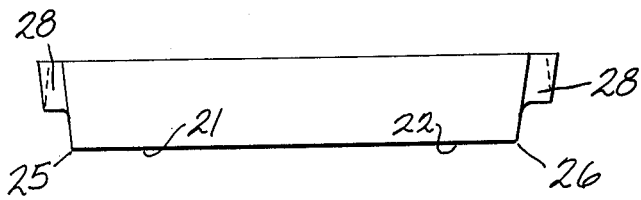
Figure 6:
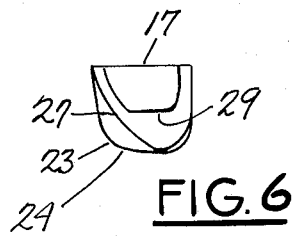

In the drawing, FIG. 1 is a top plan view of an aircraft wing tip light, FIG. 2 is a bottom perspective, FIG. 3 is a top plan view with the upper surface broken away, FIG. 4 is a view on line 4—4 of FIG. 3 showing only the optical system, FIG. 5 is a top plan view of the exit lens, and FIG. 6 is an end view of the exit lens.

The wing tip light is a folded sheet metal insert having screw holes 1 along the ends and back for attachment to the wing. In the front edge 2 is fixed an exit lens 3 of substantially the full thickness of the front edge of the wing and receiving light from a lamp mounting assembly arranged between a projection 4 on the top wall 5 of the insert and a cover plate 6 on the bottom wall 7 of the insert. The light shines on the back side of the exit lens 3 in the direction of travel indicated by arrow 8.

The swept back wings of supersonic aircraft are relatively thin and have very little space for wing tip lights. Also, the angle of sweep back causes loss of light due to total internal reflection within the exit lens if the exterior contour of the glass is the same as that of the leading edge of the wing itself, due to the poor optical performance of this shape, dictated as it is by aerodynamic considerations. Over small areas at least, departure from the aerodynamic shape, if not too severe or too far out into the atmosphere, are not detrimental to aerodynamic drag. The design herein described departs purposely from the shape of the leading edge of the wing.

The lamp mounting assembly 9 is mounted on the bottom wall 7. It carries a lamp 10 having terminals 11 mounted on a holder 12 and having a horizontal filament 13 substantially perpendicular to the direction of travel of the aircraft. The lamp mounting assembly may, for example, be that shown in the application Ser. No. 345,139, filed February 17, 1964, Robert R. Peterson. Also mounted on the bottom wall 7 is a holder 14 for an aspheric condensing lens 15 substanially parallel to the filament 13. The purpose of the condensing lens is to receive light from a large solid angle and project it forward. When viewed edgewise as in FIG. 4, the focus of the lens 15 is at the filament and directs the light forward in a beam with parallel rays. There is some up and down illumination, but the primary beam is forward. In the plan view of FIG. 3, the focus of the lens 15 is behind the lamp filament. This results in a high efficiency of light projecting in the forward direction of arrow 8 without directing all of the light forward. There, accordingly, is still some sidewise or outboard illumination in the direction of arrow 16.

In front of the first surface 17 of the exit lens 3 is a filter 18. For the left wing, all but red light is removed from the beam while from the right wing, all but green light is removed from the beam. The light passing through the filters 18 is known as "Aviation Red" and "Aviation Green." The filters are not necessary when the exit lenses are of colored material. When the exit lenses are of colored material the lenticular surface is incorporated into the first surface of each lens. The first surface 19 of the filter has ridges 20 which cause the impinging light to be refracted or deflected up and down.

The ridges 20 provide a lenticular surface. The ridges 20 are not strictly parallel to the upper and lower surfaces of the exit lens but, rather, are inclined so that when mounted in the aircraft wing tip, the ridges are horizontal. The ridges may not be continuous as shown. They may be broken up into short sections, with the ends of the sections sloped to refract light outboard, or they may be broken up into sections such that each section as a whole refracts light outboard, different sections sending light to different outboard angles. In general, each section would continue to have the lenticular feature of spreading light vertically. The purpose of the lenticular surface is to spread the light flux into a more desirable pattern. Very high intensity can be achieved by omitting the spreading feature, but this leaves the light poorly visible from all but dead-ahead directions. Accordingly, the lenticular surface is inserted to provide vertical spread to the pattern. The abutting surfaces of the filter and exit lens are complementary and preferably plane. This permits color and transmission control by grinding the filters to such a thickness as is required for a particular batch of glass. Further, grinding the first surface of the exit lens allows us to more closely control the thickness of this exit lens piece than by merely pressing the glass.

The efficiency of light transmission is improved by the exit lens contour shown in FIGS. 5 and 6. Between points 21 and 22 the second or exit surface of the lens has the contour 23 with a blunt or almost flat second surface 24 taking up substantially the entire thickness of the lens. This prevents total internal reflection of rays striking the surface 24 and insures that substantially all of the light reaching the first surface 17 of the lens will be transmitted through the second surface 24. Between points 21 and 25 and also between points 22 and 26, the exit lens contour blends to the air foil contour 27. If the entire exit lens were of the contour 27, only about one-fourth of the light would get through and the remaining three-fourths would be lost by total internal reflection. The ends 28 of the exit lens are formed to a convenient shape for mounting, such as the contour indicated at 29.

The exit lens is mounted by clamps 32 on a bracket 33 fixed to the bottom wall 7 of the insert. A sealing compound 34 fills any gap between the lens and the front edge of the insert. The exit lens 3, the condenser lens 15 and the lamp 13 are mounted by brackets 32, 14 and 9 to the bottom wall 7 of the insert, thereby maintaining the accurate optical relation required for efficient operation. The optical relation is not changed when the lamp 13 is changed by removing the access plate 6.

In order to increase the outboard or sidewise light transmission, some of the light from filament 13 flows through passageway 30 and strikes reflector 31 which directs the light sidewise in the direction of arrow 16. The reflector 31 may have a rough surface so as to provide diffused reflection. An additional reflector 32a is provided to direct light against reflector 31. This provides the desired outboard visibility so the aircraft will be visible from the side as well as from the front. The reflectors 31 and 32a may be replaced by a single reflector which reflects the light outboard.

What is claimed as new is:

1. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, an exit lens in the front edge of the insert having a first surface presented to the lamp filament and a second surface having a flattened center section occupying substantially the full thickness of the wing and having end sections blending into the front edge of the wing.

2. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, a condenser lens between the lamp filament and the front edge of the insert, said condenser lens having a first surface presented to the lamp filament and a second surface presented toward the front edge of the insert, the curvature of the condenser lens in a vertical plane placing the focus at the filament and the curvature of the condenser lens in a horizontal plane placing the focus behind the lamp filament.

3. An aircraft wing tip comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, an exit lens in the front edge of the insert having a first surface presented to the lamp filament and a second surface having a flattened center section occupying substantially the full thickness of the wing and having end sections blending into the front edge of the wing, a condenser lens between the lamp filament and the front edge of the insert, said condenser lens having a first surface presented to the lamp filament and a second surface presented toward the front edge of the insert, the curvature of the condenser lens in a vertical plane placing the focus at the filament and the curvature of the condenser lens in a horizontal plane placing the focus behind the lamp filament.

4. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, an exit lens in the front edge of the insert having a first surface presented to the lamp filament and a second surface having a flattened center section occupying substantially the full thickness of the wing, a filter having a lenticular first surface for deflecting the incident light up and down and a second surface mating with the first surface of the exit lens.

5. An aircraft wing tip light for swept back wings comprising an insert with top and bottom walls blending into the top and bottom walls of the wing tip and with a front edge blending into the front edge of the wing tip, a lamp between the top and bottom walls and behind the front edge of the insert having a horizontal filament transverse to the direction of travel of the aircraft, an exit lens in the front edge of the insert having a first surface presented to the lamp filament and a second surface having a flattened center section occupying substantially the full thickness of the wing and end sections blending into the front edge of the wing.

6. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, a condenser lens between the lamp filament and the front edge of the insert, said condenser lens having a first surface presented to the lamp filament and a second surface presented toward the front edge of the insert, the curvature of the condenser lens in a vertical plane placing the focus at the filament and the curvature of the condenser lens in a horizontal plane placing the focus behind the lamp filament, and a reflector to the inboard side of the lamp filament for reflecting light outboard through the exit lens to provide outboard visibility of the wing tip light.

7. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, a lamp holder fixed to the bottom wall of the insert, a condenser lens between the lamp filament and the front edge of the insert, said condenser lens having a first surface presented to the lamp filament and a second surface presented toward the front edge of the insert, a holder for the condenser lens fixed to said bottom wall of the insert, an exit lens in the front edge of the insert having reduced ends behind the front edge of the insert, and clamping means fixed to said bottom wall gripping said reduced ends.

8. An aircraft wing tip light comprising an insert with top and bottom walls blending into the top and bottom walls of the wing and with a front edge blending into the front edge of the wing, a lamp between the top and bottom walls and behind the front edge of the insert having a horizontal filament transverse to the direction of travel of the aircraft, a lamp holder fixed to the bottom wall of the insert, an exit lens in the front edge of the insert having reduced ends behind the front edge of the insert, and clamping means fixed to said bottom wall gripping said reduced ends.

References Cited by the Examiner

UNITED STATES PATENTS

| 1,427,505 | 8/1922 | Whyte | 240—41.3 |
| 1,539,090 | 5/1925 | King | 240—41.3 |
| 1,737,027 | 11/1929 | Schoonmaker | 240—41.36 |
| 2,328,032 | 8/1943 | Roper | 240—7.7 |
| 2,375,075 | 5/1945 | Carruth | 240—7.7 X |
| 3,113,726 | 12/1963 | Pennow et al. | 240—1.2 |

FOREIGN PATENTS

| 1,257,240 | 2/1961 | France. |

NORTON ANSHER, *Primary Examiner.*